(12) United States Patent
Kantak et al.

(10) Patent No.: US 9,106,729 B2
(45) Date of Patent: Aug. 11, 2015

(54) PERSONAL GATEWAY FOR ORIGINATING AND TERMINATING TELEPHONE CALLS

(75) Inventors: Vinay Kantak, Topsfield, MA (US); Yogesh Patel, Campbell, CA (US); Sabeer Bhatia, San Francisco, CA (US)

(73) Assignee: Sabse Technologies, Inc., Mountain View, CA (US)

( * ) Notice: Subject to any disclaimer, the term of this patent is extended or adjusted under 35 U.S.C. 154(b) by 2231 days.

(21) Appl. No.: 11/409,478

(22) Filed: Apr. 21, 2006

(65) Prior Publication Data

US 2006/0239252 A1    Oct. 26, 2006

Related U.S. Application Data

(60) Provisional application No. 60/673,951, filed on Apr. 22, 2005.

(51) Int. Cl.
| | |
|---|---|
| *H04L 12/66* | (2006.01) |
| *H04L 12/28* | (2006.01) |
| *H04M 7/12* | (2006.01) |
| *H04M 11/06* | (2006.01) |

(52) U.S. Cl.
CPC ............ *H04M 7/1205* (2013.01); *H04M 7/125* (2013.01); *H04M 11/066* (2013.01)

(58) Field of Classification Search
CPC . H04L 65/103; H04L 29/06027; H04L 12/12; H04M 15/8044; H04M 7/0057
See application file for complete search history.

(56) References Cited

U.S. PATENT DOCUMENTS

| | | | |
|---|---|---|---|
| 6,205,211 B1* | 3/2001 | Thomas et al. | 379/114.06 |
| 6,791,970 B1* | 9/2004 | Ng et al. | 370/352 |
| 7,548,535 B1* | 6/2009 | Godwin | 370/352 |
| 2002/0024945 A1* | 2/2002 | Civanlar et al. | 370/352 |
| 2002/0114439 A1* | 8/2002 | Dunlap | 379/219 |
| 2004/0052347 A1* | 3/2004 | Kimura et al. | 379/102.01 |
| 2005/0025043 A1* | 2/2005 | Mussman et al. | 370/216 |
| 2005/0226400 A1* | 10/2005 | Farber et al. | 379/114.01 |
| 2006/0187900 A1* | 8/2006 | Akbar | 370/352 |

FOREIGN PATENT DOCUMENTS

WO    WO 2004102919 A1 *  11/2004  ............. H04L 29/06

\* cited by examiner

*Primary Examiner* — Melanie Jagannathan
(74) *Attorney, Agent, or Firm* — Lathrop & Gage LLP

(57) ABSTRACT

A system, method and software product connects a call from an internet protocol (IP) phone and a telephone apparatus connected to a public switched telephone network (PSTN) using a personal gateway configured within a network group. A call from a user of the IP phone is answered and the user is authenticated. A destination number for the telephone apparatus is received from the user. A list of personal gateways is created based upon the destination number. The list is prioritized based upon least cost routing. A highest priority personal gateway that is available is determined using the prioritized list. The highest priority personal gateway that is available is instructed to dial the destination number using a PSTN interface. The IP phone connects with the telephone apparatus to make the call. The call terminates and associated resources are freed if either the IP phone or the telephone apparatus hangs-up.

10 Claims, 11 Drawing Sheets

PERSONAL GATEWAY FOR ORIGINATING AND TERMINATING TELEPHONE CALLS

RELATED APPLICATIONS

This application claims priority to provisional patent application Ser. No. 60/673,951, filed Apr. 22, 2005, titled "Personal Gateway for Originating and Terminating Telephone Calls," which is incorporated herein by reference.

BACKGROUND

Today the Internet provides for voice communication using various IP protocols. Various mobile or wired devices and software are now available that enable telephony using Internet Protocol (IP) and technologies such as 802.11. Such devices utilize certain hardware and software to enable a voice call to be made using the Internet. A user may for example make a voice call using voice over Internet Protocol ("VoIP") to another device connected to the Internet. It is also possible to make a call from an IP device (e.g., an IP phone) provided by a VoIP service provider, to a conventional telephone device connected to a public switched telephone network ("PSTN"). A service provider usually charges for the call, typically requiring subscription to a service that provides the calling mechanism. The service provider may, for example, provide cheap (i.e., using PSTN local call rates) connectivity to PSTN subscribers in certain locations where specific equipment is installed for connectivity between the Internet and the PSTN, while not providing connectivity to PSTN subscribers in other locations. Currently such interconnectivity between the VoIP networks and PSTN is established through proprietary gateways and routers deployed by the respective service providers and telephony operators. Although such systems may result in cheaper connectivity, compared to conventional PSTN routes, to some locations, the cost of connecting a mobile IP device using VoIP to the PSTN in other locations (especially international) can be significant and the locations where this connectivity is possible is limited.

SUMMARY

In one embodiment, a personal gateway connects a call between an internet protocol (IP) phone and a telephone apparatus connected to a public switched telephone network (PSTN). At least one PSTN interface connects to a PSTN line. An internet interface connects to the Internet. Gateway software operates to connect a call between the IP phone and the telephone apparatus based upon least cost routing.

In another embodiment, a personal gateway provides voice call connectivity between a first apparatus connected to a public switched telephone network (PSTN) and a second apparatus connected to a PSTN. At least one PSTN interface connects to a PSTN line. An internet interface connects to the Internet. Gateway software operates to connect a voice call between the first apparatus and the second apparatus via the Internet and a second personal gateway of a network group.

In another embodiment, a method connects a call from an internet protocol (IP) phone to a telephone apparatus connected to a public switched telephone network (PSTN) using a personal gateway configured within a network group. A call from a user of the IP phone is answered and the user is authenticated. A destination number for the telephone apparatus is received from the user. A list of personal gateways is created based upon the destination number. The list is prioritized based upon least cost routing. A highest priority personal gateway that is available is determined using the prioritized list. The highest priority personal gateway that is available is instructed to dial the destination number using a PSTN interface. The IP phone connects with the telephone apparatus to make the call. The call terminates and associated resources are freed if either the IP phone or the telephone apparatus hangs-up.

In another embodiment, a software product has instructions, stored on computer-readable media, wherein the instructions, when executed by a computer, perform steps for connecting a call from an internet protocol (IP) phone to a telephone apparatus connected to a public switched telephone network (PSTN) using a personal gateway configured within a network group, including: instructions for answering a call from a user of the IP phone; instructions for authenticating the user; instructions for receiving, from the user, a destination number for an apparatus connected to a PSTN; instructions for creating a list of personal gateways based upon the destination number; instructions for prioritizing the list based upon least cost routing; instructions for determining, using the prioritized list, a highest priority personal gateway that is available; instructions for instructing the highest priority personal gateway that is available to dial the destination number using a PSTN interface; instructions for connecting the IP phone with the telephone apparatus to make the call; and instructions for terminating the call and freeing associated resources if either the IP phone or the telephone apparatus hangs-up.

In another embodiment, a method connects calls between a first and a second apparatus connected to one or more public switched telephone networks (PSTNs) using a personal gateway configured within a network group. A call made by a first user of the first apparatus connected to the PSTN is answered, the user is authenticated and a destination number for the second apparatus connected to a PSTN is received from the user. A list of personal gateways based upon the destination number is created and prioritized based upon least cost routing. A highest priority personal gateway that is available is determined using the prioritized list. The highest priority personal gateway that is available is instructed to dial the destination number using a PSTN interface and the first apparatus is connected with the second apparatus to make the call. The call is terminated and associated resources freed if either the first or second apparatus hangs-up.

In another embodiment, a software product has instructions, stored on computer-readable media, wherein the instructions, when executed by a computer, perform steps for connecting calls between a first and a second apparatus connected to one or more public switched telephone networks (PSTNs) using a personal gateway configured within a network group, including: instructions for answering a call made by a first user of the first apparatus connected to the PSTN; instructions for authenticating the user; instructions for receiving, from the user, a destination number for the second apparatus connected to a PSTN; instructions for creating a list of personal gateways based upon the destination number; instructions for prioritizing the list based upon least cost routing; instructions for determining, using the prioritized list, a highest priority personal gateway that is available; instructions for instructing the highest priority personal gateway that is available to dial the destination number using a PSTN interface; instructions for connecting the first apparatus with the second apparatus to make the call; and instructions for terminating the call and freeing associated resources if either the first or second apparatus hangs-up.

DETAILED DESCRIPTION

A personal gateway is configured to complete and/or divert calls and/or requests for service. The personal gateway may be hosted on a personal computer (PC) platform that connects to the Internet and to public switched telephone network (PSTN). The acronym PSTN may hereinafter also refer to mobile telephone networks and may implement protocols such as global system for mobile communications (GSM) 2, 2.5, 3G, code-division multiple access (CDMA), personal handyphone system (PHP) and wireless local loop (WLL). The personal gateway may operate to originate and to terminate voice communication calls from/to a PSTN device (e.g., a conventional telephone apparatus connected to the PSTN). Thus the personal gateway may operate to connect a call originating from an Internet Protocol (IP) phone to a telephone apparatus connected to a PSTN, or may operate to connect a call originating from an apparatus connected to a PSTN to another telephone apparatus connected to the PSTN (or another PSTN) via a second personal gateway. Multiple personal gateways may be interconnected, via the Internet, to form a network group of personal gateways that provide connectivity between one or more PSTN devices and/or one or more IP devices. Each personal gateway of the network group may be controlled to limit access to services provided by the personal gateway, or not. A personal gateway may provide a peer to peer service for use by itself and/or other personal gateways of the network group. Each personal gateway provides resources to the network, and, in-turn, may utilize resources provided by other personal gateways of the network group. An optimally sized network may, for example, provide inexpensive (e.g., using local PSTN call rates) connectivity between telephone devices (PSTN devices and IP devices) located anywhere in the world, since there is not restriction on location of a personal gateway.

Figure 1:
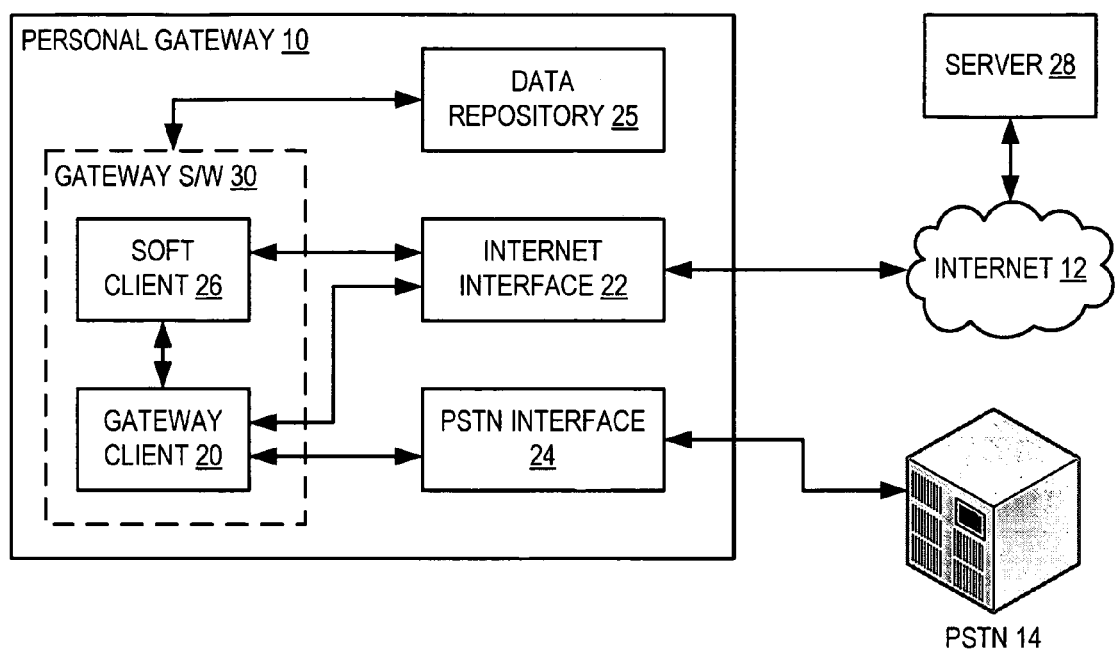
FIG. 1 shows a block diagram illustrating one exemplary embodiment of a personal gateway for originating and terminating telephone calls between public switched telephone network ("PSTN") devices and Internet devices.

FIG. 1 shows a block diagram illustrating one exemplary personal gateway 10 for originating and terminating PSTN telephone calls and/or IP telephone calls. Personal gateway 10 has an Internet interface 22 for connecting to Internet 12 and a PSTN interface 24 for connecting to a PSTN 14. Internet interface 22 is, for example, an Internet modem and/or a router that connect to the Internet 12 via an Internet service provider (not shown). PSTN interface 24 is, for example, a Facsimile (FAX) modem (or modem or any other device for connecting a PC to a PSTN line) that provides connectivity to PSTN 14. Personal gateway 10 has a data repository 25 for storing configuration information, access lists, network related information and other relevant data.

Personal gateway 10 is also shown with gateway software 30 that includes a soft client 26 and a gateway client 20. Soft client 26 facilitates voice communication over internet 12 using a voice over internet protocol (VoIP). Soft client 26 may also be installed within an Internet protocol (IP) phone to facilitate use of personal gateways and personal gateway network groups. Gateway client 20 may interact with other personal gateways to form network groups, and may interact with a server 28. Gateway software 30 may, for example, be implemented on a personal computer (PC) (see FIG. 6).

Server 28 facilitates cooperation between personal gateways within a network group. In one example of operation, gateway client 20 communicated with server 28, via internet interface 22 and internet 12, to join a network group. Server 28 may, for example, collect, store and provide presence information as to which personal gateways within a network group are authorized and available, and details of resources provided by each personal gateway. Personal server 30 may include additional PSTN interfaces for connection to multiple PSTN lines.

Figure 2:
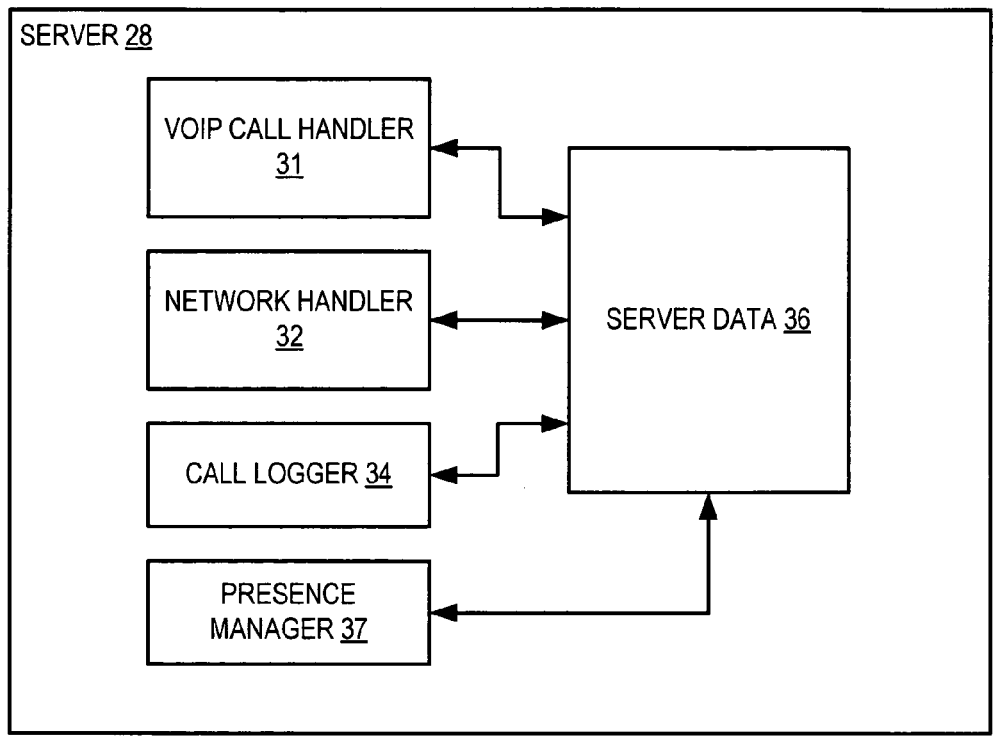
FIG. 2 shows a block diagram illustrating one exemplary embodiment of a server.
Figure 3:
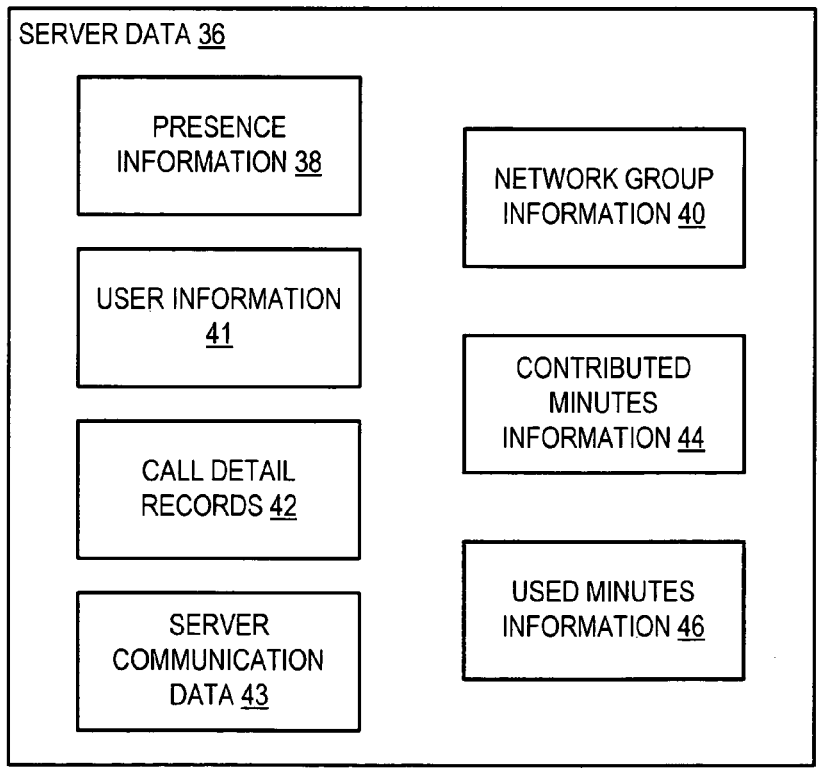
FIG. 3 shows a block diagram illustrating exemplary data stored within the server of FIG. 2.

FIG. 2 shows a block diagram illustrating server 28 in further detail. Server 28 is shown with a VoIP call handler 31, a network handler 32, a call logger 34, a presence manager 37 and server data 36. FIG. 3 shows a block diagram illustrating server data 36 in further detail, including presence information 38, network group information 40, user information 41, call detail records (CDRs) 42, server communication data 43, contributed minute information 44 and used minute information 46. FIG. 2 and FIG. 3 are best viewed together with the following description.

To use server 28, a user may acquire an account number (e.g., a server account number or an IP phone number) and a password/PIN. Alternatively, the user may register gateway software 30 using a valid license number. Other registration methods may be used without departing from the scope hereof. Once an account number and password/PIN are obtained, access to facilities provided by server 28 are permitted. In one example of operation, gateway software 30, within personal gateway 10, FIG. 1, is configured with a valid account number and password/PIN. Gateway software 30 then registers personal gateway 10 with server 28 using Internet interface 22 and internet 12; server 28 records presence of personal gateway 10 in presence information 38. Other information of personal gateway 10 is also recorded in server data 36 such that resources of personal gateway 10 may be made available to other personal gateways and/or users.

Network handler 32 allows personal gateways (e.g., personal gateway 10) to register availability and participation within a network group. For example, personal gateway 10 may register with network handler 32 of server 28, storing information within network group information 40, user information 41 and server communication data 43 associated with configuration, resource contribution and network groups, if any, to which it is a member.

Call logger 34 records call detail records (CDRs) (e.g., CDRs 42) for calls made using personal gateways. These CDRs are processed by call logger 34 to determine resources (e.g., minutes of call duration made through a personal gateway by account holders other than the owner of the gateway) contributed by personal gateways within a network group and call duration minutes accumulated by each account holder when using personal gateways of the network group (or personal gateways open to use by account holders not in the group associated with the personal gateway) that are not their own. Thus, a personal gateway owner may trade personal used minutes against minutes provided by his personal gateway to other account holders.

As the number of personal gateways on the network grows, more servers (e.g., server 28) may be networked together for load-distribution, efficiency, or redundancy. Such multiple servers cooperate to function as a 'cluster' based either on geographical (local, regional, national, and international) constructs or any other functional division that may be assigned to them. Server 28 authenticates each soft-client 26 that connects to it, maintaining presence information 38 of each personal gateway 10 and soft-client 26 to ensure that appropriate information is available for propagating to other soft clients for management of network groups and operation thereof. Server 28 may also provide enhanced services such as call redirection and have the capability to provide NAT reversal such that calls can easily pass through fire walls.

Figure 4:
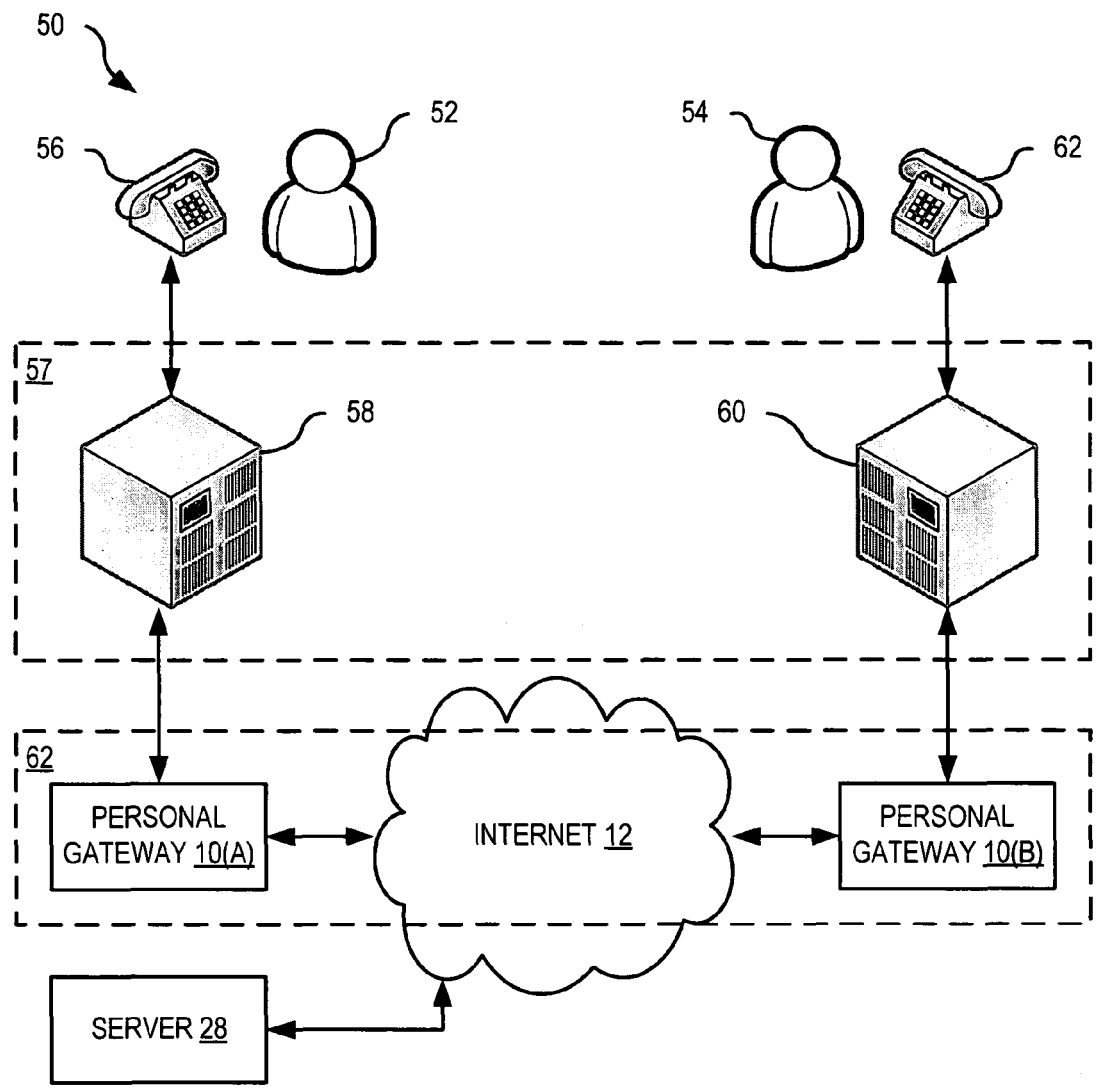
FIG. 4 is a schematic diagram illustrating one exemplary call between two PSTN telephone users utilizing two personal gateways and the Internet.
Figure 5:
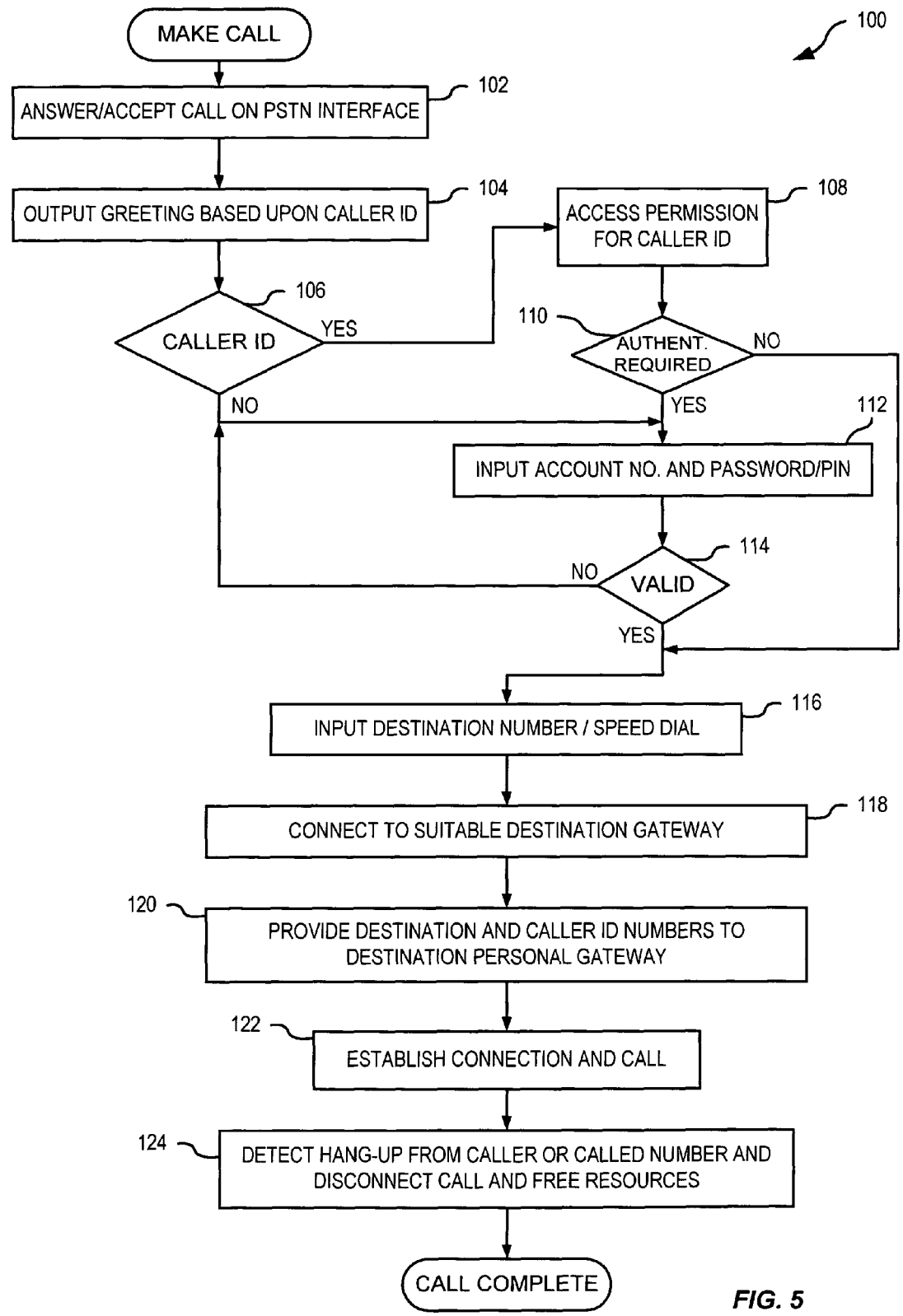
FIG. 5 is a flowchart illustrating one process for making the call of FIG. 4.

FIG. 4 is a schematic diagram illustrating one exemplary telephone call 50 between two PSTN telephone users 52, 54 utilizing telephone apparatus 56, 62, PSTNs 58 and 60 and two personal gateways 10(A), 10(B), respectively, a server 28 and Internet 12. Personal gateways 10(A) and 10(B) represent instantiations of personal gateway 10, FIG. 1. PSTN 58 and PSTN 60 may be independent, or may be part of a large PSTN as indicated by outline 57. Thus, even though a direct connection between apparatus 56 and apparatus 62 though PSTN 57 may be possible, connection though personal gateways 10 and Internet 12 may be more cost effective. FIG. 5 is a flowchart illustrating one process 100 for making the call illustrated in FIG. 4. FIGS. 4 and 5 are best viewed together with the following description.

In overview, user 52 dials a PSTN telephone number of personal gateway 10(A) on telephone apparatus 56. PSTN 58 creates a call from apparatus 26 to personal gateway 10(A), which automatically answers the call and greets the calling party (i.e., user 52) with an information message. User 52 then, through use of apparatus 56, instructs (e.g., user 52 dials a PSTN telephone number of apparatus 62 or selects a speed dial number previously configured within personal gateway 10(A)) personal gateway 10(A) to make a call to telephone apparatus 62. Personal gateway 10(A) determines, though use of server 28 for example, that a call may be made to apparatus 62 through personal gateway 10(B), via Internet 12. Thus, personal gateway 10(A) connects to personal gateway 10(B) and requests that personal gateway 10(B) dial the PSTN telephone number for apparatus 62 via PSTN 60. Personal gateway 10(B) thus calls apparatus 62 and once user 54 answers, the call is connected through apparatus 56, PSTN 58, personal gateway 10(A), Internet 12, personal gateway 10(B), PSTN 60 and apparatus 62.

Process 100 is implemented within personal gateway 10(A); it may be implemented in gateway software 30, FIG. 1, for example. User 52 first dials the PSTN telephone number of personal gateway 10(A) on apparatus 56. PSTN 58 then creates a call from apparatus 56 to personal gateway 10(A) (i.e., PSTN 58 connects to PSTN interface 24 of personal gateway 10(A)). In step 102, process 100 detects the call received at PSTN interface 24 and answers it such that PSTN 58 establishes a call between apparatus 56 and personal gateway 10(A). In step 104, process 100 outputs an audible message to the calling apparatus. In one example of step 104, personal gateway 10(A) outputs an audible message to apparatus 56 via PSTN interface 24 that includes a greeting and instructions for using the personal gateway 10(A). In another example of step 104, an audible greeting message is selected, based upon a caller ID (i.e., the number of the calling apparatus 56) received from PSTN 58, and output to apparatus 56 via PSTN interface 24.

Step 106 is a decision. If, in step 106, a caller ID is received from PSTN 58, process 100 continues with step 108; otherwise process 100 continues with step 112 to request account and password information to identify the caller. In step 108, process 100 determines if the caller ID represents a known user of personal gateway 10(A) and, if so, whether that user requires further authentication.

Step 110 is a decision. If, in step 110, process 100 determines that further authentication is required, process 100 continues with step 112; otherwise process 100 continues with step 116. In one example of step 110, gateway client 20 determines that the calling apparatus is recognized and does not require further identification, thereby alleviating the user from entering account and password information when connecting from known apparatus. In step 112, process 100 requests account and password information from the user of apparatus 56. In one example of step 112, personal gateway 10A outputs an audio prompt requesting the user to enter an account number and a password. The user may then enter account and password information to be identified and authenticated. In another example, if the caller-ID is recognized but further authentication is required, personal gateway 10 may output an audio messing requesting a password associated with the identified caller ID; the user then inputs a password or personal identification number(PIN) for further authentication.

Step 114 is a decision. If, in step 114, process 100 determines that the account and password/PIN entered in step 112 is valid, process 100 continues with step 116; otherwise process 100 continues with step 112 to again request the account and password/PIN information from the user.

In step 116, process 100 requests a destination number from the user and inputs this number as entered on apparatus 56. In one example of step 116, gateway client 20 outputs an audible message to prompt user of apparatus 56 to dial the destination dumber or to select a speed dial number, defined previously within personal gateway 10(A).

In step 118, process 100 determines a suitable personal gateway, based upon the destination number, and connects to that personal gateway. In one example of step 118, personal gateway 10(A) determines that personal gateway 10(B) is best suited (based on a set of rules and availability of Personal Gateway 10(B)) for creating a call to the destination telephone number, and personal gateway 10(A) connects to personal gateway 10(B) via Internet 12. In step 120, process 100 provides the destination number, input in step 116, to the connected personal gateway. In one example of step 120, personal gateway 10(A) sends the destination number to personal gateway 10(B). Personal gateway 10(A) may also send the caller ID and the associated account information of the user to personal gateway 10(B), and request that the destination number be dialed. In step 112, process 100 establishes a connection and call to the destination number. In one example of step 112, personal gateway 10(B), upon receipt of the destination number and the caller ID from personal gateway 10(A), dials the destination number on PSTN 60. PSTN 60 then rings apparatus 62, connecting the call once user 54 answers. The call is then established between apparatus 52 and apparatus 62 through PSTN 58, personal gateway 10(A), Internet 12, personal gateway 10(B) and PSTN 60 thereby enabling communication between users 52 and 54.

Step 124 detects hang-up from either apparatus 56 or apparatus 62 and disconnects the call and frees allocated resources. PSTN interface 24 is then available to receive other calls from PSTN 58 or to make calls via PSTN 58.

Figure 6:
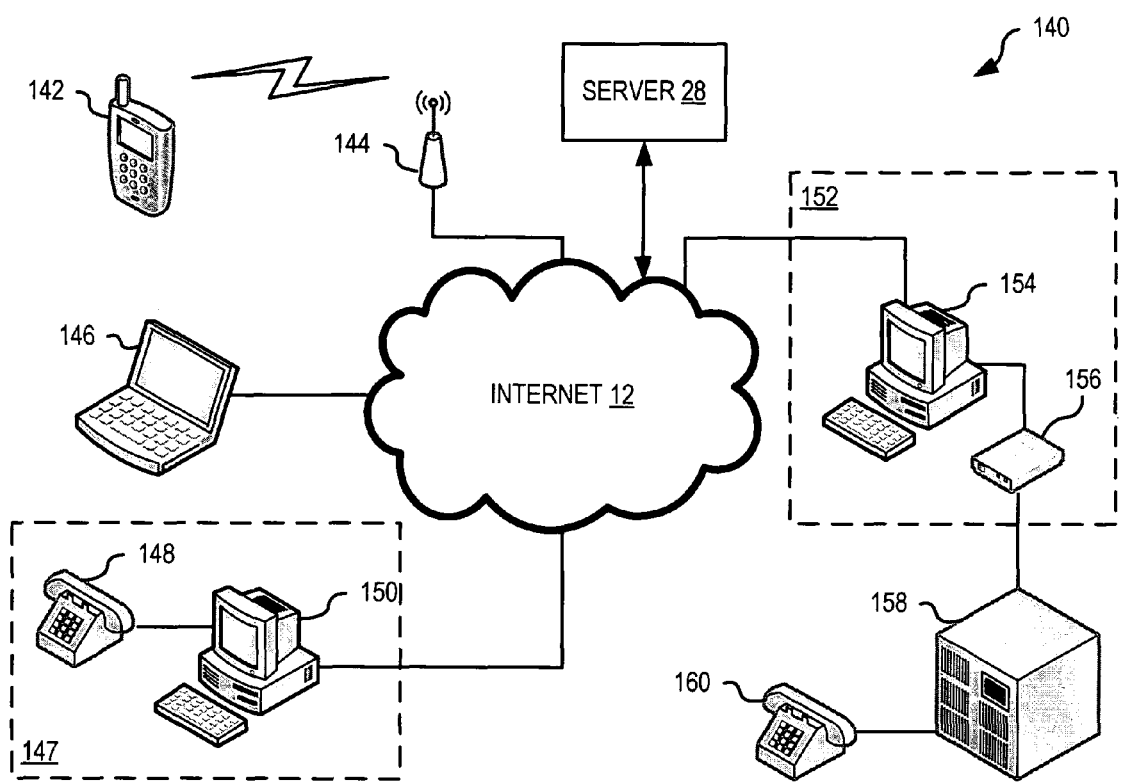
FIG. 6 is a schematic diagram illustrating one scenario for utilizing a personal gateway to connect a VoIP call to a PSTN apparatus user.
Figure 7:
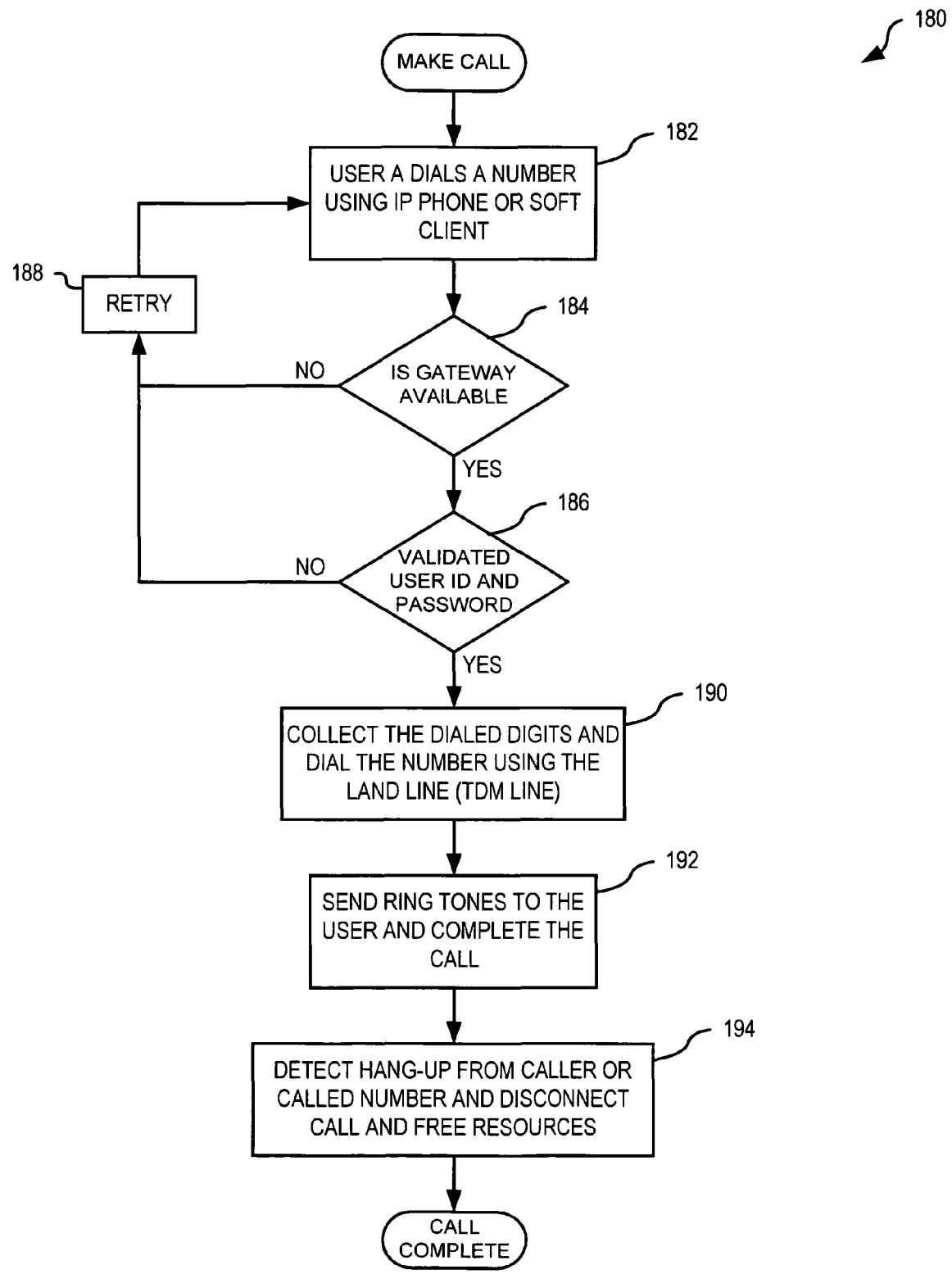
FIG. 7 is a flowchart illustrating one process for making the call of FIG. 6.

FIG. 6 is a schematic diagram illustrating exemplary call connectivity 140 where a personal gateway 152 is utilized to connect a VoIP call to a PSTN apparatus 160. FIG. 7 is a flowchart illustrating one exemplary process 180 for making call connectivity 140 of FIG. 6. Process 180 illustrates operations by a user, an IP phone 142 and personal gateway 152, providing an overview of interactions to setup a call between IP phone 142 and apparatus 160 connected to PSTN 158. FIGS. 6 and 7 are best viewed together with the following description.

A VoIP call may originate at (a) a wireless Internet phone 142 that connects to Internet 12 via a wireless Internet access point 144 (e.g., using a 802.11 protocol), or (b) a laptop or desktop computer 146 running a soft client (e.g., soft client 26, FIG. 1) or (c) an Internet phone 148 connected, for example via a USB connection, to a PC 150 to collectively form an Internet phone 147. Other platforms may also be used to originate a VoIP call, for example a portable digital assistant with Internet connectivity may include a soft client (e.g., soft client 26). Each device 142, 146 and 147 thus includes a soft client (e.g., soft client 26, FIG. 1) that may communicate with a server (e.g., server 28, FIG. 1) to originate and/or receive a VoIP call. In the following example, an IP call originates from IP phone 142 (but could originate from any device capable or making an IP call) and connects to personal gateway 152. Personal gateway 152 may, for example, represent personal gateway 10, FIG. 1.

Personal gateway 152 is illustratively shown with a PC 154, running gateway software 30, FIG. 1, and a PSTN interface 156 (e.g., a FAX modem or other device for connecting to a PSTN line) external to PC 154. PC 154 is also connected to Internet 12, for example by a wide area network (WAN) connection, and may receive VoIP calls from Internet 12. PSTN interface 156 of personal gateway 152 provides connectivity between PC 154 and a PSTN 158.

In the example of FIGS. 6 and 7, a user first dials a destination number for telephone apparatus 160 from an IP phone (e.g., one of devices 142, 146 and 147) to make a call to telephone apparatus 160 connected to a PSTN 158. Soft client 26, within the IP phone (e.g., one of devices 142, 146 and 147), determines which personal gateway is best suited (if there are multiple gateways available) and which personal gateway available to connect the call. In the example of FIGS. 6 and 7, only personal gateway 152 is available (i.e., only personal gateway 152 is available for use by the user based upon personal gateway networks to which the user belongs, for example). If no personal gateway is available, the user receives a busy tone. The user may then hang-up and attempt to connect to the telephone apparatus 160 again later, or may dial another destination number to attempt another connection.

In step 182, process 180 dials a destination number identifying telephone apparatus 160. In one example of step 182, a user dials the telephone number of telephone apparatus 160 using IP phone 142. Step 184 is a decision. If in step 184, process 180 determines that a personal gateway is available to make this call. If no personal gateway is available, process 180 continues with step 188; otherwise process 180 continues with step 186. In one example of step 184, soft client 26 within IP phone 142 contains information as to which personal gateways (i.e., personal gateway 152 in this example) are suitable to make this call and thus soft client 26 prioritizes a list of suitable personal gateways based upon a least cost routing. Soft client 26 may then contact server 28 to determine if the highest priority personal gateway is available to make this call. In another example, soft client 26 creates a prioritized (based on least cost routing) list of suitable personal gateways for making the call and then contacts each personal gateway in tern, in the prioritized order of the list, to determine if the personal gateway is available to make this call. Once an available personal gateway is found, process 180 continues with step 186.

In one example, personal gateway 152 is the only suitable personal gateway but is busy handling another call, and therefore cannot connect to the IP call from IP phone 142. The user of IP phone 142 may therefore hear a 'busy' indication.

Step 186 is a decision. If, in step 186, process 180 determines that the IP call is from an authenticated user, process 180 continues with step 190; otherwise process 80 continues with step 188. In one example of step 186, personal gateway 152 may prompt the user of IP phone 142 to enter an account number and password/PIN. Account number and password/PIN entry may be automated by soft client 26 within IP phone 142. If the account number and password/PIN are authenticated, personal gateway 152 continues with step 190; otherwise personal gateway 152 may prompt the user to re-enter the account number and password/PIN or may simply output an audio message to the user indicating the failure to authenticate and hang-up. In another example of step 186, personal gateway 152 may utilize a caller ID/user ID, received from IP phone 142, to authenticate the IP call.

In step 188, process 180 may decide to re-enter the destination number, repeating steps 182 though 186 to again attempt connection.

In step 190, process 180 collects the dialed digits of the destination number and dials the destination number on a PSTN connection. In one example of step 190, personal gateway 152 receives the destination number from soft client 26. Personal gateway 152 then utilizes PSTN interface 156 to dial the destination number, received from IP phone 142, using a PSTN line connected to PSTN 158. In step 192, process 180 sends ring tones to the IP phone, and once the PSTN apparatus corresponding to the dialed number connects, process 180 connects the call. In one example of step 192, personal gateway 152 receives ring tones from PSTN 158 and sends these ring tones to IP phone 142. Once apparatus 160 answers the call, personal gateway 152 connects IP phone 142 to apparatus 160 via Internet 12, PSTN interface 156 and PSTN 158. As appreciated, personal gateway 152 communicates with IP phone 142 using VoIP, and with PSTN interface 156 using an appropriate protocol associated with PSTN interface 156 (e.g., PCM packets). PSTN interface 156 converts between PCM packets and audio signal to enable communication with PSTN 158, and thereby apparatus 160.

Figure 8:
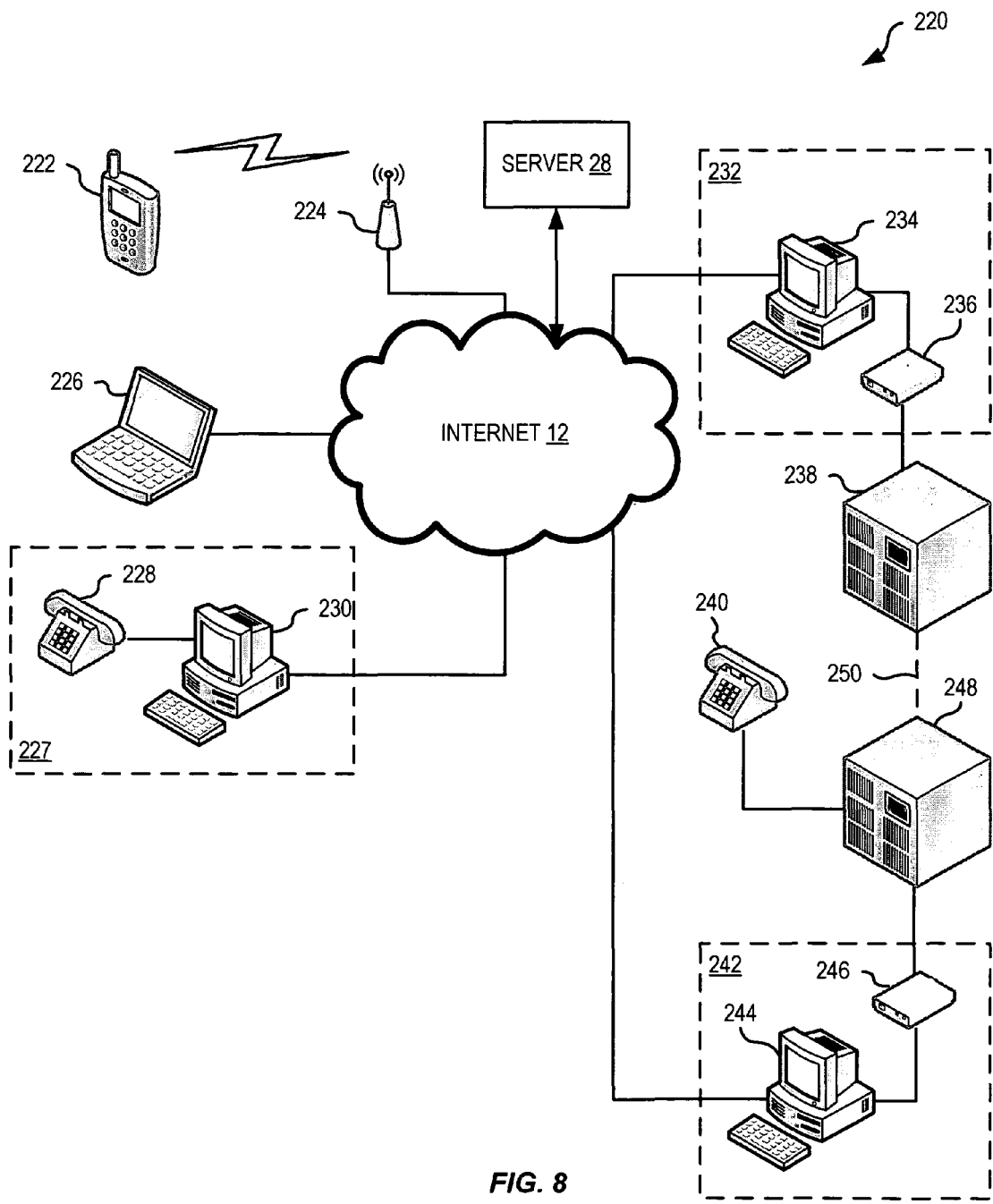
FIG. 8 is a schematic diagram illustrating one scenario for selecting one or two trusted personal gateways to connect an Internet call to a PSTN apparatus user.
Figure 9:
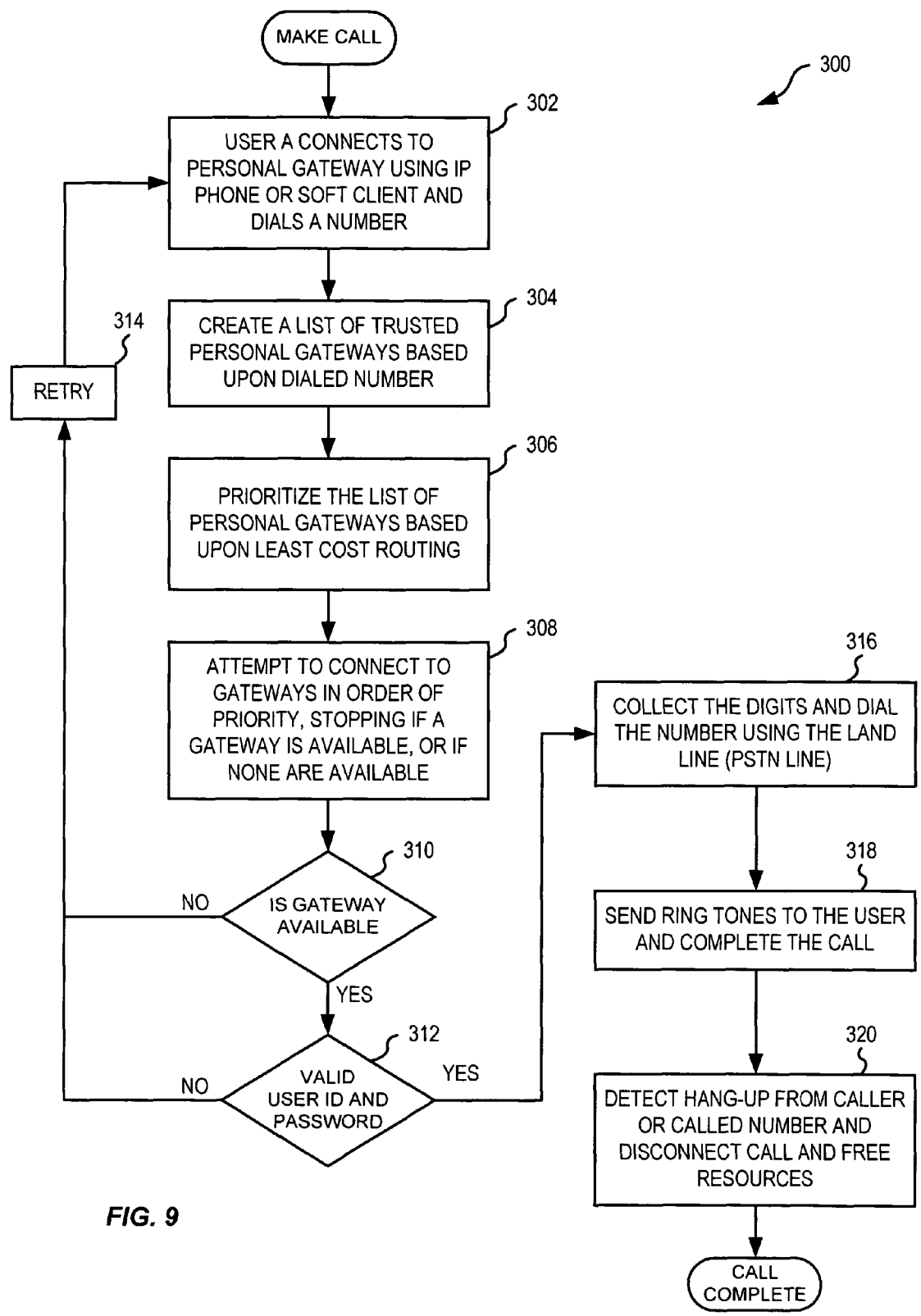
FIG. 9 is a flowchart illustrating one exemplary process for making the call shown in FIG. 8.

FIG. 8 is a schematic diagram illustrating one scenario 220 for selecting one or two trusted personal gateways to connect an Internet call to a PSTN apparatus user. FIG. 9 is a flowchart illustrating one exemplary process 300 for making the call shown in FIG. 8. FIG. 8 and FIG. 9 are best viewed together.

In particular, FIG. 8 shows three IP phones 222, 226 and 227, server 28, Internet 12, two personal gateways 232 and 242 that are configured in a trusted network group, a PSTN 238, a PSTN 248 and a telephone apparatus 240. PSTN 238 and PSTN 248 may be connected (as shown by connection 250) or may be separate. IP phone 227 includes an IP handset 228 that is connected (e.g., using a USB connection) to a PC 230. Devices 222, 226 and 230 each host client software (e.g. soft client 26, FIG. 1) that operates to communicate with server 28. IP phone 222 connects to Internet 12 via a wireless protocol and a WiFi hub 224. Personal gateway 232 is illustratively shown with a PC 234 and a PSTN interface 236 that provides connectivity to PSTN 238. Personal gateway 242 is illustratively shown with a PC 244 and a PSTN interface 246 that provides connectivity to PSTN 238. PSTN interface 236 and PSTN interface 246 are, for example FAX modems or other such devices for connecting a PC to a PSTN line. In the following example, IP phone 222 makes a call to a telephone apparatus 240 connected to PSTN 248.

In step 302, a user dials, using an IP phone (i.e., any of devices 222, 226 and 227), a PSTN telephone number of a telephone apparatus connected to a PSTN. In one example of step 302, a user dials a PSTN telephone number for apparatus 240 using IP phone 222. In step 304, a soft client of the IP phone creates a list of personal gateways based upon the PSTN telephone number entered in step 302. In one example of step 304, soft client 26 within IP phone 222 creates a list that includes personal gateway 232 and personal gateway 242. In another example of step 304, soft client 26 contacts server 28 to determine, for example based upon information of the dialed PSTN telephone number, and the location of personal gateways with a trusted network, which personal gateways may be used for the call.

In step 306, the soft client prioritizes the list of personal gateways based upon least cost routine. In one example of step 306, soft client 26 within IP phone 222 prioritizes the list created in step 304 based upon the cost of making the call to apparatus 240; soft client 26 makes personal gateway 242 higher in priority than personal gateway 232 since a PSTN call from personal gateway 242 to apparatus 240 is cheaper than a call from personal gateway 232 to apparatus 240. In step 308, the soft client attempts to connect to each personal gateway in the prioritized list, in order of priority, stopping if a personal gateway is available or of no personal gateways are available. In one example of step 308, soft client 26 within IP phone 222 contacts personal gateway 242 to determine if personal gateway is available, which it is, and then continues with step 310.

Step 310 is a decision. If, in step 310, the soft client determines that a personal gateway is available, process 300 continues with step 312; otherwise process 300 continues with step 314.

Step 312 is a decision. If, in step 312, the gateway software within the connected personal gateway validates the account number and password/PIN of the user, or a caller ID and PIN of the user, and if authenticated continues with step 316; otherwise process 300 continues with step 314. In step 314, the use may receive a 'busy' tone, and be asked to enter an alternate destination number. Steps 302 through 308 are then repeated to connect another call.

In step 316, process 300 collects the digits for the destination number and dials the number using the PSTN line. IN one example of step 316, gateway software 30 within personal gateway 248 collects the destination number, received from soft client 26 of IP phone 222, and dials the number on a PSTN line using PSTN interface 246. In step 318, process 300 sends ring tones to the user and completes the connection for the call. In one example of step 318, gateway software 30 generates ring tones and sends these to IP phone 222 while waiting for PSTN 248 to connect the call. Once PSTN 248 connects the call, gateway software 30 within personal gateway 242 completes the call.

In step 320, process 300 maintains the call until hang-up is detected from the caller or the called party. If hang-up is detected, process 300 disconnects the call and frees resources allocated to the call. In one example of step 320, if gateway software 30 within personal gateway 242 detects hang-up from either IP phone 222 or apparatus 240, then it disconnects the call and frees resources allocated to the call.

Similar to scenario 220, an IP phone (e.g., IP phones 222, 226, 227) may connect to apparatus 240 using personal gateways that are not trusted (i.e., opened for public use). In this case, soft client 26 within the IP phone determines, based upon default settings or customized options configured by or for the user, that any public personal gateway available for connection to the dialed number may be used.

Figure 10:
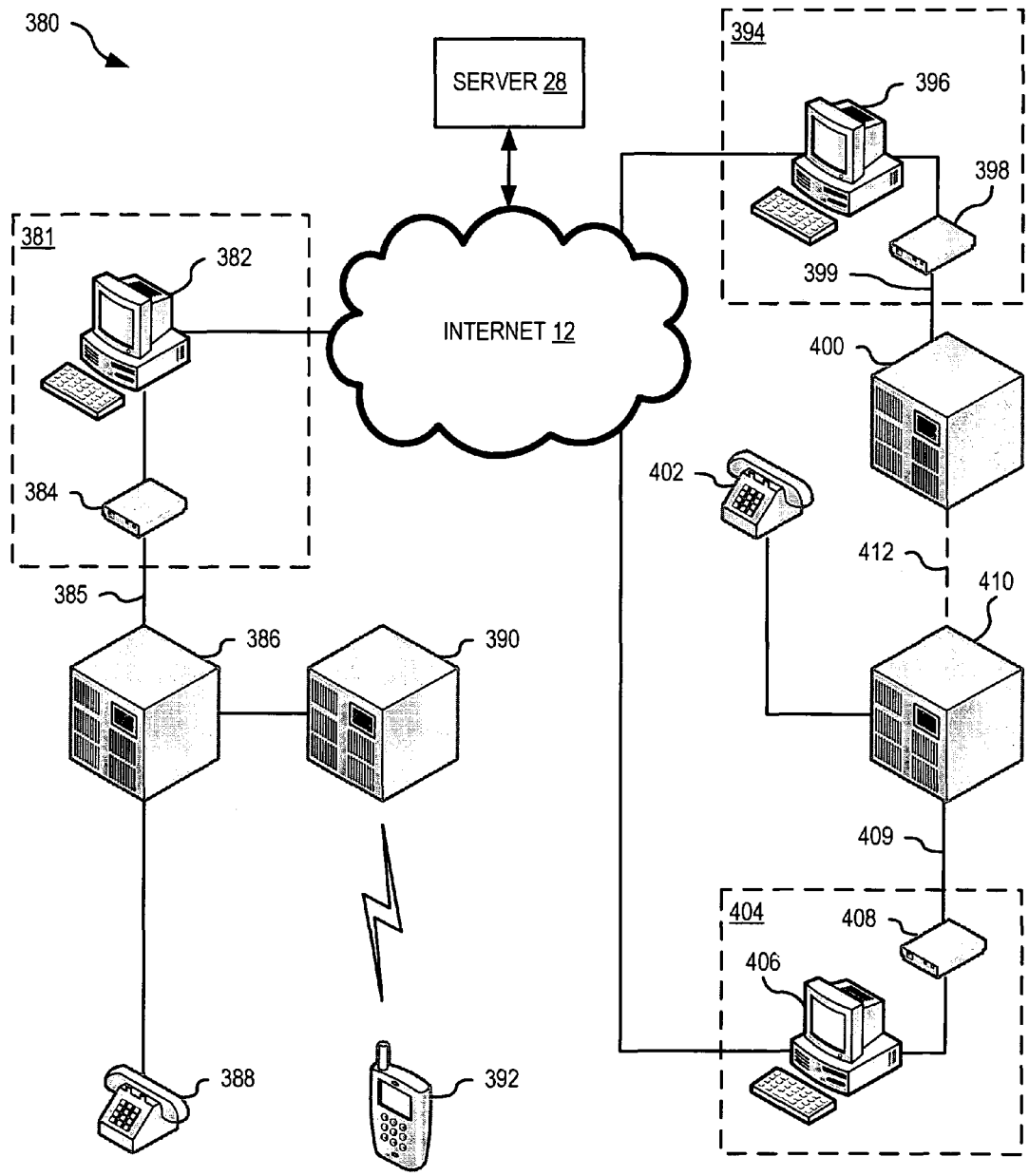
FIG. 10 is a schematic diagram illustrating one scenario for utilizing two personal gateways, of a personal gateway network, to allow a PSTN apparatus user or cell phone user to connect to their personal gateway to make a call to a another PSTN apparatus user.
Figure 11:
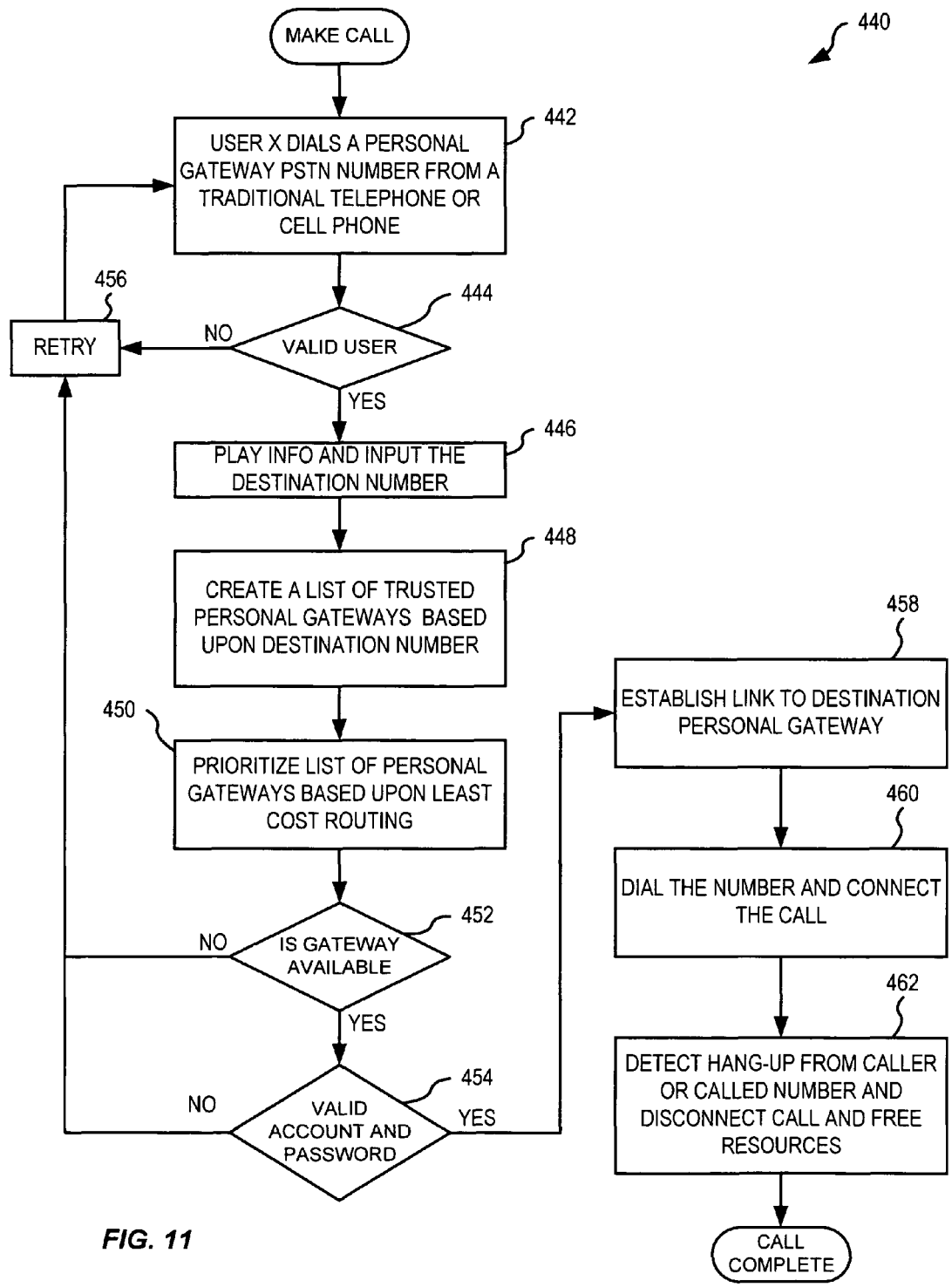
FIG. 11 is a flowchart illustrating one process for making the call shown in FIG. 10.

FIG. 10 is a schematic diagram illustrating one scenario 380 for utilizing two personal gateways, of a trusted personal gateway network, to allow a PSTN apparatus user or cell phone user to connect to a personal gateway to make a call to a another PSTN apparatus user. FIG. 11 is a flowchart illustrating one process 440 for making the call shown in FIG. 10, and in particular, process 440 illustrates exemplary actions and operations of a traditional telephone user and one or more of personal gateways 381, 394 and 404. Scenario 380 may, for example, illustrates an owner of gateway 381 making a call though a trusted network group, to a PSTN line in another locale. By using the network of personal gateways, the user reduces, or even eliminates, cost of calling the PSTN line, as compared to connecting directly though a PSTN.

In particular, FIG. 10 shows three personal gateways 381, 394 and 404 of a trusted network group. Personal gateway 381 is illustratively shown with a PC 382 and a PSTN interface 384; PC 382 is also connected to Internet 12. PSTN interface 384 is a FAX modem or other such device for connecting a PC to a PSTN line. PSTN interface 384 connects to a PSTN 386 via a PSTN line 385. PSTN 386 is illustratively shown with one telephone apparatus 388 and a connection to a wireless switch 390 that is illustratively shown with one wireless phone 392.

Personal gateway 394 is illustratively shown with a PC 396 and a PSTN interface 398; PC 396 is also connected to Internet 12. PSTN interface 398 is a FAX modem or other such device for connecting a PC to a PSTN line. PSTN interface 398 connects to a PSTN 400 via a PSTN line 399. PSTN 400 is illustratively shown with one telephone apparatus 402.

Personal gateway 404 is illustratively shown with a PC 406 and a PSTN interface 408; PC 406 is also connected to Internet 12. PSTN interface 408 is a FAX modem or similar such device for connecting a PC to a PSTN line. PSTN interface 408 connects to PSTN 400 via a PSTN line 409. PSTN 386, PSTN 400 and PSTN 401 may be part of the same carrier PSTN, or may be a separate (regional, national, or international) network as shown in this example. PSTN 400 and 410 are shown with a connection 412 in this example.

In step 442, a user dials a PSTN number of a first gateway using either a traditional telephone apparatus connected to a PSTN or a cell phone connected to a wireless switch. In one example of step 442, a first user dials a PSTN telephone number of personal gateway 381, owned by the first user for example, using telephone apparatus 388. PSTN 386 then 'rings' line 385, alerting PSTN interface 384 to the call. PSTN interface 384 then answers the call.

Step 444 is a decision. If, in step 444, process 440 identifies the calling party as a valid user of gateway 381, process 440 continues with step 446; otherwise process 440 continues with step 456. In one example of step 444, personal gateway 381 identifies and authenticates the calling party as a valid user of personal gateway 381 using a caller ID received from PSTN 386. In another example of step 444, say in absence of a caller ID, personal gateway 381 requests the calling party to enter an account number and a password/PIN for identification as a valid user of personal gateway 381.

In step 446, process 440 outputs an information message requesting the calling party enter a destination number. In one example of step 446, the caller enters a destination PSTN number on a keypad of telephone apparatus 388.

In step 448, process 440 creates a list of trusted personal gateways based upon the destination number. In one example of step 448, gateway software 30 (e.g., using soft client 26) creates a list of personal gateways within the same network group that are capable of connecting to the destination number based on the configuration, network, and usage data available in its data repository 25. In another example of step 448, soft client 26 of personal gateway 381 interacts with server 28 to determine which trusted personal gateways can be used for the call.

In step 450, process 440 prioritizes the list of personal gateways based upon least cost routing (LCR) information. In one example of step 450, client software 26 within personal gateway 381 orders the list created in step 448 and makes personal gateway 404 a higher priority than personal gate 394 since a call cost for connecting personal gateway 404 to apparatus 402 is less than a call cost from personal gateway 394 to apparatus 402. Prioritization of gateways can also be dependent on additional factors such as the quality of service of a gateway, its bandwidth/throughput, etc.

Step 452 is a decision. In step 452, process 440 uses the prioritized list of gateways and attempts to connect to them in the sequential order of priority. If, in step 450, process 440 determines that a personal gateway is available, process 440 continues with step 454; otherwise, if no personal gateways are available, process continues with step 456. In one example of step 452, soft client 26 within personal gateway 381 determines that personal gateway 404 is available and soft client 26 continues with step 454. In another example of step 452, gateway software 30 within personal gateway 381 determines that personal gateway 404 is not available, and therefore selects personal gateway 394 since it is next in the list and available. If no gateway is available, in step 456, the user may be asked to dial a different number, or wait and try the number again later, repeating steps 442 though 450.

Step 454 is a decision. In step 454, the personal gateway selected in step 450 validates the user requesting the call. If validation is successful, process 440 continues with step 458; otherwise the process continues with step 456, where the use may be informed that he/she does not currently have the access and prompted to either dial a different number, or wait and try the number again later, repeating steps 442 though 450. In one example of step 454, gateway software 30 within personal gateway 404 validates the user ID and password/PIN received from telephone apparatus 388 and continues with step 458. In another example of step 454, personal gateway 394 skips authentication based upon the caller ID associated with the first user (i.e., received from apparatus 388) and continues with step 458.

Personal gateway 394 may also directly authenticate personal gateway 381 and, in turn, personal gateway 381 may authenticate the user using the caller ID or account number/pin combination. In this case, only one personal gateway authenticates the users (i.e., the user is authenticated by the first personal gateway encountered).

In step 458, process 440 establishes a link to the destination personal gateway. In one example of step 458, personal gateway 381 establishes a link to personal gateway 404. In step 460, process 440 dials the PSTN destination number and connects the call. In one example of step 460, personal gateway 404 utilizes PSTN interface 408 to dial the destination number on PSTN line 409, and once the receiving party answers the call using apparatus 402, personal gateway 404 connects apparatus 388 with apparatus 402 via personal gateways 381 and 404 and Internet 12. Operation of step 460 continues for the duration of the call.

In step 462, if process 440 detects that either the caller or receiving party hangs-up, the call is terminated and resources associated with the call are freed. In one example of step 462, gateway software 30 within personal gateway 381 detects that cell phone 392 has terminated the call, and therefore informs personal gateway 404 to terminate the call. Each of the personal gateways disconnects the call and frees associated resources. Server 28 may also be updated to record a CRD for the call and to track status of personal gateways 381 and 404.

A scenario similar to scenario 380 occurs when, for example, the user is traveling and uses a personal gateway within the same network group as his home personal gateway to connect to his home personal gateway to make a PSTN call. Thus, the user can make local calls to his home locale from remote locations. In this similar scenario, the user first connects to personal gateway 394 and then, by entering a number local to personal gateway 382, personal gateway 394 determines that personal gateway 382 has highest priority for connecting the call to a PSTN apparatus. In one example, gateway software 30 within one or more personal gateways 10 are configured to only make local PSTN calls, thereby reducing or eliminating call costs incurred by personal gateway 10.

Figure 12:
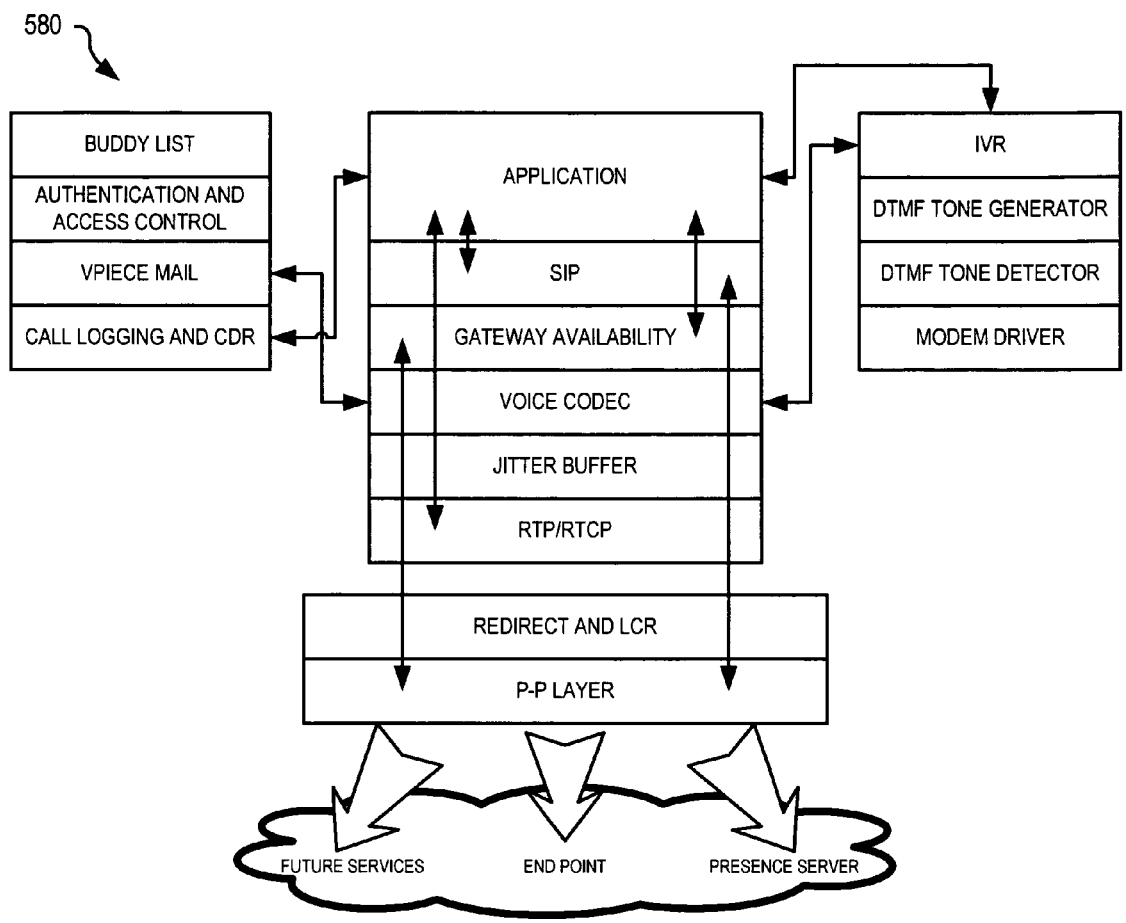
FIG. 12 is a block diagram illustrating exemplary software architecture of one embodiment of a personal gateway.

FIG. 12 is a block diagram illustrating exemplary software architecture of one embodiment of a personal gateway. Note that SIP and RTP/RTCP protocols and Codices may be selected as required to facilitate operation of the personal gateway.

SUMMARY

Each personal gateway has one or more of the following features and capabilities:

1) Personal gateway may be hosted on a user's PC. The PC is loaded with gateway software and the client software (e.g., client software 30).
2) Each personal gateway communicates with a central server (or a cluster of servers) if made a part of P2P network or network group.
3) The PC, and hence the personal gateway, is connected to Internet and it can receive a VoIP call. This first personal gateway will authenticate the caller and then terminate the call via a PSTN telephone line connected to the personal gateway or connect the call to a second personal gateway, via a P2P connection, which in turn will authenticate the caller or the calling gateway and terminate the call via a PSTN line connected to the second personal gateway. The second personal gateway may be owned and operated by a different user.
4) An IP call is received by the personal gateway (which is a user's PC or other device/appliance), is converted from IP to TDM and is terminated (i.e., connected to a PSTN) based on the user profile.
5) Each personal gateway may include authentication, P2P monitoring, P2P offline/online. The client software is secured so that it is impossible to access other data residing on the PC or other devices connected to the PC or on the PC's network.

6) Each personal gateway will have a user interface with an option to selectively become part of a P2P network (e.g., network group).
7) Each personal gateway may be configured to allow selective users, based on phone number (caller ID), user ID, password/PIN, IP address or other user identification mechanism, access to the personal gateway. Also, gateway can be allowed to select other gateway to send calls to them.
8) Each personal gateway will keep a log of the CDRs resulting from use of the personal gateway. This data may be replicated and stored in a central repository on a server (e.g., server 28, FIG. 1) which will track each network group and/or personal gateway user's contributed minutes and used minutes.
9) A user may buy minutes from a central management server (e.g. server 28). Trades between a user's personal gateway minutes and use of other gateway minutes can be flexible based on the location and market conditions.
10) A central management server (e.g., server 28, FIG. 1), in cooperation with client software located within personal gateways and IP phones etc., may be used to determine available resources and authorization for making a given call at a given moment.

The use of personal gateways and network groups provides significant advantages over conventional VoIP services. For example, network groups may be privately owned to serve business needs. Personal gateways may be added to public network groups to create extensive communication capabilities. Requirements to create a personal gateway and join existing, or create new, network groups requires only basic equipment, typically already owned by a PC user. Calls may be received from a PSTN landline connected to a modem or other comparable device within, or connected to, a PC and terminated via the Internet using a "trusted personal gateway" (i.e., a personal gateway within a trusted or private network group) or an open personal gateway (i.e., a personal gateway within a public network group). In one example of operation, if a call is received via PSTN landline, the personal gateway answers the call, and may operate as an answering machine to allow a caller to leave a message, or if the caller presses a key (say *) then the personal gateway will initiate an interactive voice response (IVR) system to further interact with the caller. The IVR system may, for example, authenticate the caller and request a destination number. Based upon the destination number entered, client software of the personal gateway may determine, with or without communication with a server (e.g., server 28, FIG. 1), an appropriate remote personal gateway to terminate (i.e., connect) the call.

Thus, an entirely new way of long distance (regional, national, and/or international) dialing though network grouped personal gateways, either closed (private) or open (public), may be created.

The gateway software (e.g., gateway software 30, FIG. 1), loaded onto each PC (or other computing device) to form a personal gateway, is a very intelligent communication center. The following is a functional summary of client software capabilities and functions:
1) Peer to peer (P2P) communication.
2) Transport IP based voice call (VoIP) (with future capabilities of multi-media).
3) Convert IP call to TDM and vice versa using the host computer's processor and/or the PSTN interface device (e.g., a FAX modem or any other equivalent communication device)).
4) Forming a closed network group through use of P2P, inviting other personal gateways to join the network group. Once accepted, members of the closed group may use other personal gateways within the network group to make and terminate calls.
5) Personal gateway may also join a public network group, thereby allowing anyone using the soft client software and gateway software access to the personal gateway to terminate calls or originate calls.
6) The client software will be capable of providing the following: IP-IP calls, IP to phone, Phone to IP, and Phone to phone.
7) Part or all of the gateway software (e.g. soft-client) may be loaded on GPRS phone or a 3G phone or a wireless WiFi phone.

The gateway software will use fax modem or other equivalent device, to perform the following function:
1) An IVR system with option of answering machine, fax or advance service like calling out
2) Authentication of the user who is calling in to access advance services.
3) Act as a gateway and convert the call from TDM to IP.
4) The software will also dial out for an incoming call over IP.
5) It will convert the call from IP to TDM.
6) Fax Send, Receive, Print, Broadcast, Scan, Sign, Annotate.
7) Message access and notifications by PC, Phone, Pager, or Fax.
8) Delivers messages and faxes right into your Outlook or web based email.

Key Features for IVR

IVR system may include one or more of the following features and functions:
  a) Access control, Voice mail, Fax, Telephone, and Virtual Personal Assistant
  b) Access control, Call out system and access own voice mail, Custom Greetings, Music on Hold
  c) Record private greetings based on Caller Id
  d) Call screening with unique Audio Caller Id functionality
  e) Dialer, Mute, Flash and Redial functions for outbound call Certain IVR features and functions may require a compatible voice-enabled modem or equivalent device.

Since client software (e.g., client software 30, FIG. 1) includes an IVR system, it should also be noted that the IVR system is easily configured and managed, including the following operational features:
  a) Sets up quickly in one easy step
    a. Create a sophisticated voice messaging and answering system in minutes
    b. Simple user-friendly interface makes using VoiFi easy and fun to use
    c. Fully supports Microsoft Outlook (and other prevalent email applications) so that now both your fax, e-mail, and voicemail messages come together in one common "In-Box"
    d. Use either VoiFi/Microsoft Outlook (and other prevalent PIM applications) to manage your contact information and messages
  b) Telephone Answering (voicemail) System
    a. Music on Hold, Flash/audio conference for call in (call out via IP), ReDial
    b. Quick Dial anyone using the VoiFi Address Book-ibuddy list
    c. Complete voicemail system with multiple mailbox capability
    d. Create and play personalized greetings based on who is calling you e. Automatically log all inbound and outbound voice and fax calls and displays detailed reports.
f. Reliable send/receive fax module
g. Send broadcast faxes or voice messages to any number of recipients c) Remote Access
   a. By phone: Remotely listen to new voice messages, manage mailboxes, passwords, configure access control and greetings from any phone, etc.
   b. By IP (via internet): Administer and monitor personal gateway, configure system/users/access lists etc., enable/disable gateway functions, view usage and reports, etc.

d) Compatibility
   a. Supports Class 1, 2, & 2.0 fax standards
   b. Supports TAPI compliant full duplex voice modems
   c. Microsoft Windows XP, 2000 or 2003
   d. Fully TAPI and ACPI compliant
   e. Pentium 200 Mhz or equivalent
   f. 128 MB RAM or more
   g. 200 MB of free hard disk space
   h. SVGA Video (HiColor)
   i. CD-ROM drive
   j. Windows 2000, or Windows XP, 2003 or up
   k. TAPI compliant voice modem A user can connect to a personal gateway using a WiFi phone or a soft phone and can then make a call from through the personal gateway another location. If the personal gateway is part of a trusted network group, the personal; gateway provides resources to the network group and may use resource of other personal gateways within the network group. Gateway software of the personal gateway determines through which of the available gateways in the trusted network group to use for routing calls. Each personal gateway may be configured with rules that control access to, and use of, the personal gateway by users of the network group. The personal gateway will be particularly of use in making 'local' calls to any location where a personal gateway is available for use (i.e., to which the user has authority to use). If no personal gateway of a trusted network is available, a user may select an open gateway (a personal gateway configured as part of public network).

Use of personal gateways and network groups potentially make the entire communication network flow via public IP and terminate/originate via individual or group based personal networks; any call in the world could therefore become a LOCAL call. Use of personal gateways (each connected to the Internet and a PSTN line) and one or more presence servers (e.g., server 28), may change the landscape of telecom networks, from big nodes of the prior art to 'distributed' networks, each with one or more lines. Personal gateways allow users to create personal/private telephone networks for use by a user or a group of users. In other words, these individual networks allow individuals to become telecom operators, a key benefit/impact of the personal gateway solution.

Changes may be made in the above methods and systems without departing from the scope hereof. For example, personal gateway 30 may receive a call from a PSTN apparatus and connect the call to an IP phone. A personal PC with an internet interface (and connection to the internet) and at least one telephone network connection via-a PSTN interface (e.g., a Fax/Modem or any other PC-PSTN communication device) with connection to a PSTN line provides a simple setup for creating a completely distributed and inexpensive telephone network suitable for a small user group or that can be opened up for public use. For example, a network group may be configured for friends and family use. IN another example a network group may be configured as an inter-office communication network, providing reliable and cheap calls. Typically, there will be low density call volumes though each gateway.

It should thus be noted that the matter contained in the above description or shown in the accompanying drawings should be interpreted as illustrative and not in a limiting sense. The following claims are intended to cover all generic and specific-features described herein, as well as all statements of the scope of the present method and system, which, as a matter of language, might be said to fall there between.

What is claimed is:

1. A personal gateway for connecting a call between an internet protocol (IP) phone and a telephone apparatus connected to a public switched telephone network (PSTN), wherein the personal gateway is associated with an account of an account user, comprising:
   a personal computer including:
      at least one PSTN interface connectable to a PSTN line;
      an internet interface connectable to the Internet; and
      gateway software operable to:
         join a network group of personal gateways;
         form a peer-to-peer connection between the personal gateway and a second personal gateway of the network group based upon least cost routing of the call;
         connect the call between the IP phone and the telephone apparatus using the second personal gateway;
         track, for the account,
            (i) contributed minutes based on minutes of call duration using the personal gateway by users other than the account user, and
            (ii) used minutes based on minutes of call duration using the personal gateway by account user; and
         trade contributed minutes with used minutes to determine resources available for the account user.

2. The personal gateway of claim 1, the gateway software operating to accept a call from the Internet and connect the call to the PSTN.

3. The personal gateway of claim 1, the gateway software operating to accept a call from the PSTN and connect the call to the Internet.

4. The personal gateway of claim 1, wherein the gateway software communicates with a server to join the network group of personal gateways.

5. The personal gateway of claim 4, wherein each network group operates as a private telecommunication network.

6. The personal gateway of claim 4, wherein the network group is a public group that does not require authentication for use.

7. A method for connecting a call from an internet protocol (IP) phone to a telephone apparatus connected to a public switched telephone network (PSTN) using a personal gateway comprising a personal computer (PC) having an Internet interface, a PSTN interface, and gateway software, and configured within a network group, wherein the personal gateway is associated with an account of an account user, comprising:
   answering, utilizing the Internet interface, an incoming call from the account user of the IP phone;
   authenticating the account user within the PC;
   receiving, from the account user, a destination number for the telephone apparatus;
   creating, within the PC, a list of additional personal gateways based upon the destination number;

prioritizing, within the PC, the list based upon least cost routing;
determining, using the prioritized list, a highest priority personal gateway that is available;
forming a peer-to-peer connection between the personal gateway and the highest priority personal gateway that is available;
instructing the highest priority personal gateway that is available to dial the destination number using the PSTN interface;
connecting the IP phone with the telephone apparatus to make the call via the personal gateway and the highest priority personal gateway;
terminating the call and freeing associated resources if either the IP phone or the telephone apparatus hangs-up; and,
tracking call detail record information including contributed minutes and/or used minutes by each of the personal gateways within the peer-to-peer network; and
trading, for the personal gateway, contributed minutes with used minutes to determine recourses available to the account user
wherein the highest priority personal gateway is determined based upon at least the call detail record information.

8. A software product comprising instructions, stored on computer-readable non-transitory media, wherein the instructions, when executed by a personal computer (PC) comprising an internet interface and a public switched telephone network (PSTN) interface, perform steps for connecting a call from an internet protocol (IP) phone to a telephone apparatus connected to a PSTN using at least one personal gateway associated with an account of an account user and configured within a network group, comprising:
   instructions for answering an incoming call from the account user of the IP phone using said Internet interface;
   instructions for authenticating the account user;
   instructions for receiving, from the account user, a destination number for the telephone apparatus;
   instructions for creating a list of additional personal gateways based upon the destination number;
   instructions for prioritizing the list based upon least cost routing;
   instructions for determining, using the prioritized list, a highest priority personal gateway that is available to handle the call;
   instructions for forming a peer-to-peer connection between the personal gateway and the highest priority personal gateway that is available;
   instructions for instructing the highest priority personal gateway that is available to dial the destination number using a PSTN interface of the highest priority personal gateway;
   instructions for connecting the IP phone with the telephone apparatus to make the call;
   instructions for terminating the call and freeing associated resources if either the IP phone or the telephone apparatus hangs-up;
   instructions for tracking call detail record information including contributed minutes and/or used minutes by each of the personal gateways within the peer-to-peer network; and,
   instructions for trading contributed minutes with used minutes to determine resources available to the account user;
   wherein the instructions for determining the highest priority personal gateway are configured to determine the highest priority personal gateway based upon at least the call detail record information.

9. A method for connecting a call between a first and a second apparatus connected to one or more public switched telephone networks (PSTNs) using a personal gateway associated with an account of an account user and comprising a personal computer (PC) having an Internet interface, a PSTN interface, and gateway software operating, and configured within a network group, comprising:
   answering, using the PSTN interface, a call made by a first the account user of the first apparatus connected to the PSTN;
   authenticating the first account user;
   receiving, from the first account user over the PSTN interface, a destination number for the second apparatus connected to a PSTN;
   creating a list of personal gateways based upon the destination number;
   prioritizing the list based upon least cost routing;
   determining, using the prioritized list, a highest priority personal gateway that is available to handle the call;
   forming a peer-to-peer connection between the PC personal gateway and the highest priority personal gateway that is available to handle the call;
   instructing the highest priority personal gateway that is available to dial the destination number using the PSTN interface;
   connecting the first apparatus with the second apparatus to make the call;
   terminating the call and freeing associated resources if either the first or second apparatus hangs-up; and
   tracking call detail record information including contributed minutes and/or used minutes by each of the personal gateways within the peer-to-peer network; and
   trading contributed minutes with used minutes to determine resources available for the account user;
   wherein the step of prioritizing includes prioritizing based upon at least the call detail record information.

10. A software product comprising instructions, stored on computer-readable non-transitory media, wherein the instructions, when executed by a personal computer, perform steps for connecting a call between a first and a second apparatus connected to one or more public switched telephone networks (PSTNs) using a personal gateway associated with an account of an account user comprising a personal computer (PC) having an Internet interface, a PSTN interface, and gateway software, and configured within a network group, comprising:
   instructions for answering an incoming call using the PSTN interface made by a the account user of the first apparatus connected to the PSTN;
   instructions for authenticating the account user;
   instructions for receiving, from the user, a destination number for the second apparatus connected to a PSTN;
   instructions for creating a list of personal gateways based upon the destination number;
   instructions for prioritizing the list based upon least cost routing;
   instructions for determining, using the prioritized list, a highest priority personal gateway that is available to handle the call;
   instructions for forming a peer-to-peer connection between the PC and the highest priority personal gateway that is available;

instructions for instructing, from the PC, the highest priority personal gateway that is available to dial the destination number using a PSTN interface of the highest priority personal gateway;
instructions for connecting the first apparatus with the second apparatus to make the call;
instructions for terminating the call and freeing associated resources if either the first or second apparatus hangs-up; and,
instructions for tracking call detail record information including contributed minutes and/or used minutes by each of the personal gateways within the peer-to-peer network; and,
instructions for trading contributed minutes with used minutes to determine resources available to the account user;
wherein the instructions for prioritizing include prioritizing additionally based upon at least the call detail record information.

* * * * *

UNITED STATES PATENT AND TRADEMARK OFFICE
CERTIFICATE OF CORRECTION

PATENT NO. : 9,106,729 B2
APPLICATION NO. : 11/409478
DATED : August 11, 2015
INVENTOR(S) : Vinay Kantak et al.

It is certified that error appears in the above-identified patent and that said Letters Patent is hereby corrected as shown below:

In The Specification

Column 5, Line 36, Line 37, Line 51 "though" should read --through--.
Column 6, Line 26, "from known" should read --from a known--; Line 29, "10A" should read --10(A)--; Line 34, "messing" should read --message--.
Column 7, Line 16, "setup" should read --set up--; Line 34, "or" should read --of--; Line 52, "gateway available" should read --gateway is available--; Lines 64 to 66, "If in step 184, process 180 determines that a personal gateway is available to make this call. If no" should read --If, in step 184, process 180 determines that no--.
Column 8, Line 11, "tern" should read --turn--; Line 21, "80" should read --180--.
Column 9, Line 39, "of" should read --if--; Line 53, "use" should read --user--.
Column 10, Lines 18 and 19, "to a another," should read --to another--; Line 24, "illustrates" should read --illustrate--; Line 25, "though" should read --through--.
Column 11, Line 47, "use" should read --user--; Line 49, "and prompted" should read --and be prompted--; Line 50, "though" should read --through--.
Column 13, Line 51, "though" should read --through--.
Column 15, Line 27, "call from through" should read --call through--; Line 28, "gateway another" should read --gateway to another--; Line 31, "resource" should read --resources--; Lines 33 and 34, "determines through which" should read --determines which--.

Signed and Sealed this
Fifth Day of April, 2016

Michelle K. Lee
*Director of the United States Patent and Trademark Office*